United States Patent [19]

Grote

[11] Patent Number: 4,819,763
[45] Date of Patent: Apr. 11, 1989

[54] TREE STAND FOR OBSERVATION POST

[76] Inventor: James N. Grote, Route #2, Cloverdale, Ohio 45827

[21] Appl. No.: 140,577

[22] Filed: Jan. 4, 1988

[51] Int. Cl.⁴ ............................................. A45F 3/26
[52] U.S. Cl. ................................... 182/187; 108/152
[58] Field of Search ............... 182/187, 188, 135, 134; 108/152

[56] References Cited

U.S. PATENT DOCUMENTS

| | | | |
|---|---|---|---|
| 1,955,127 | 4/1934 | Heintz | 182/187 |
| 2,168,111 | 8/1939 | Barnes | 182/187 |
| 4,069,891 | 1/1978 | McClung | 182/187 |
| 4,129,198 | 12/1978 | Hunter | 182/187 |
| 4,150,733 | 4/1979 | Plummer | 182/187 |
| 4,730,699 | 3/1988 | Threlkeld | 182/187 |

Primary Examiner—Reinaldo P. Machado
Attorney, Agent, or Firm—George R. Royer

[57] ABSTRACT

The subject apparatus is a portable tree stand for observation purposes, and generally comprises, as the basic support member, a triangularly-shaped member, basically formed as a right triangle, when observed from the perspective of a side elevational view. Disposed in the leg of the triangular member which is comparable to the hypotenuese side of such triangular member, is an opening which is adapted to hold a longitudinally and vertically extending shaft member, the upper portion of which is affixed in a pivotal manner to the undersurface of a seat structure. The upright leg of the support structure, which leg is comparable to the vertical leg of the triangle, has upper and lower support elements adapted to engage the outer circumference of a tree trunk so as to affix the apparatus in a vertical position along said tree trunk.

1 Claim, 2 Drawing Sheets

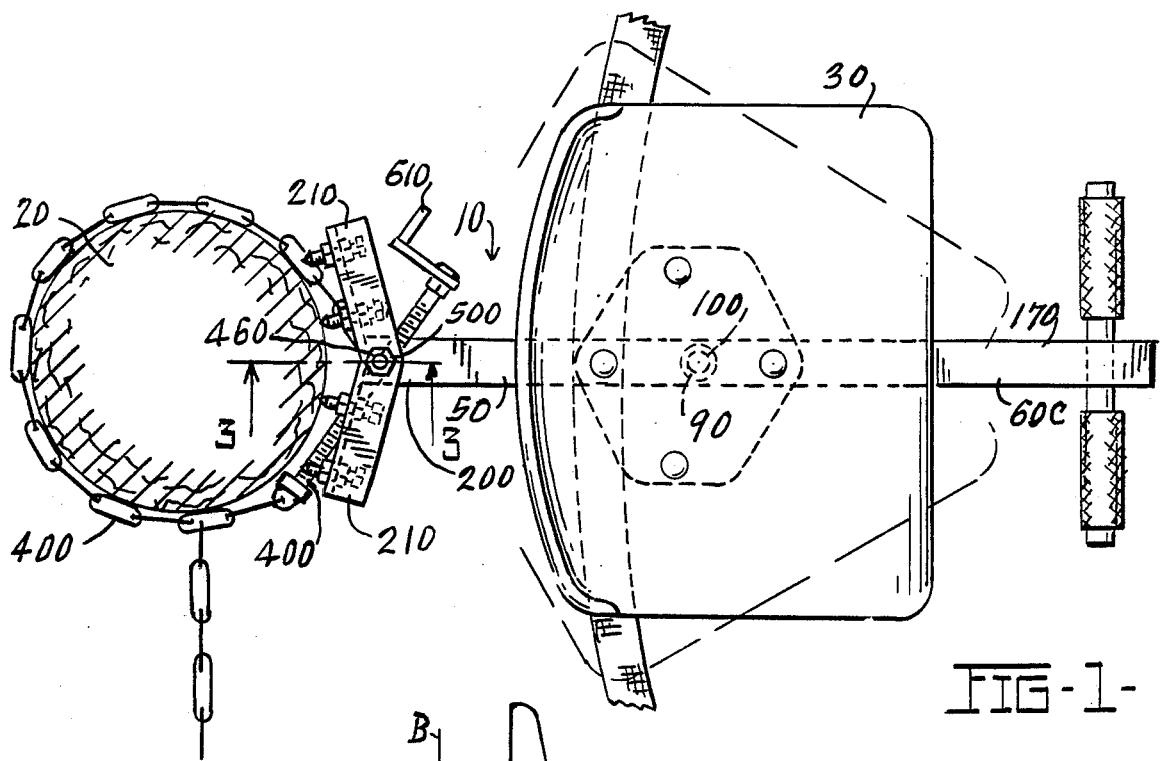
FIG-1-
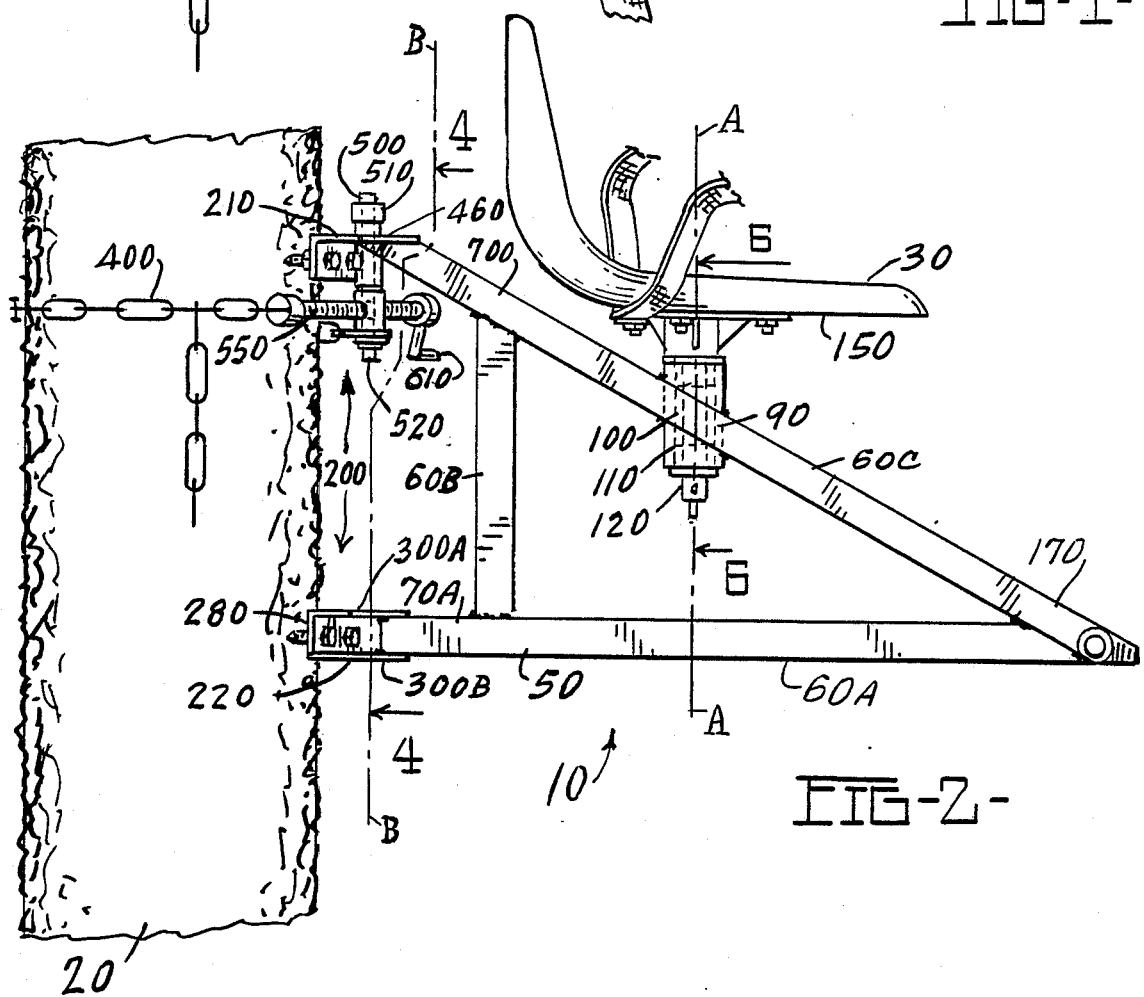
FIG-2-

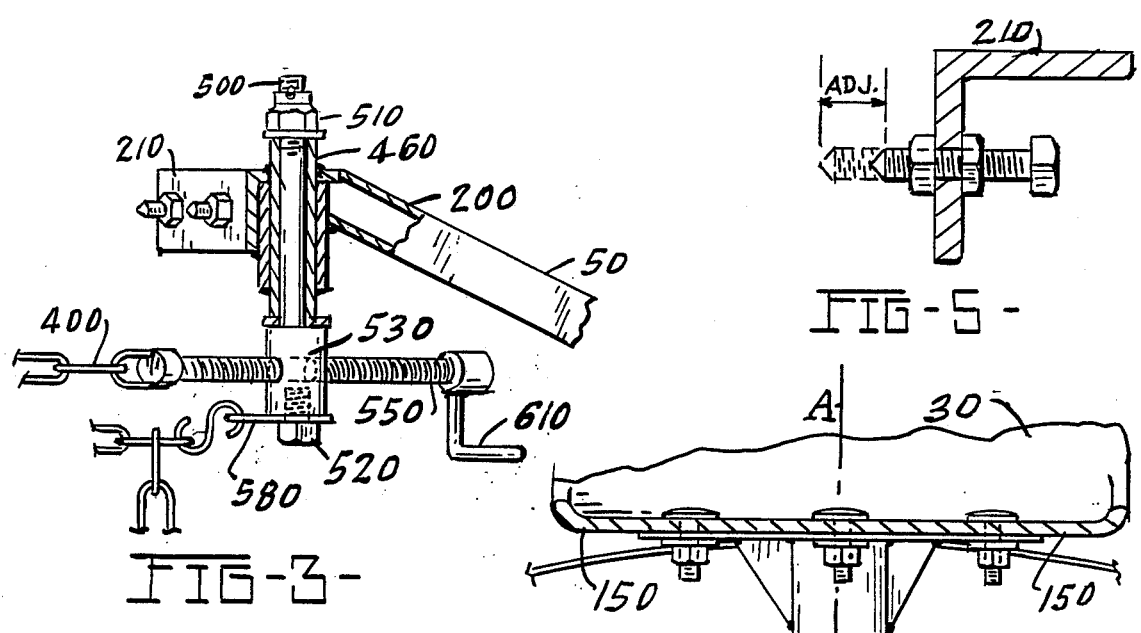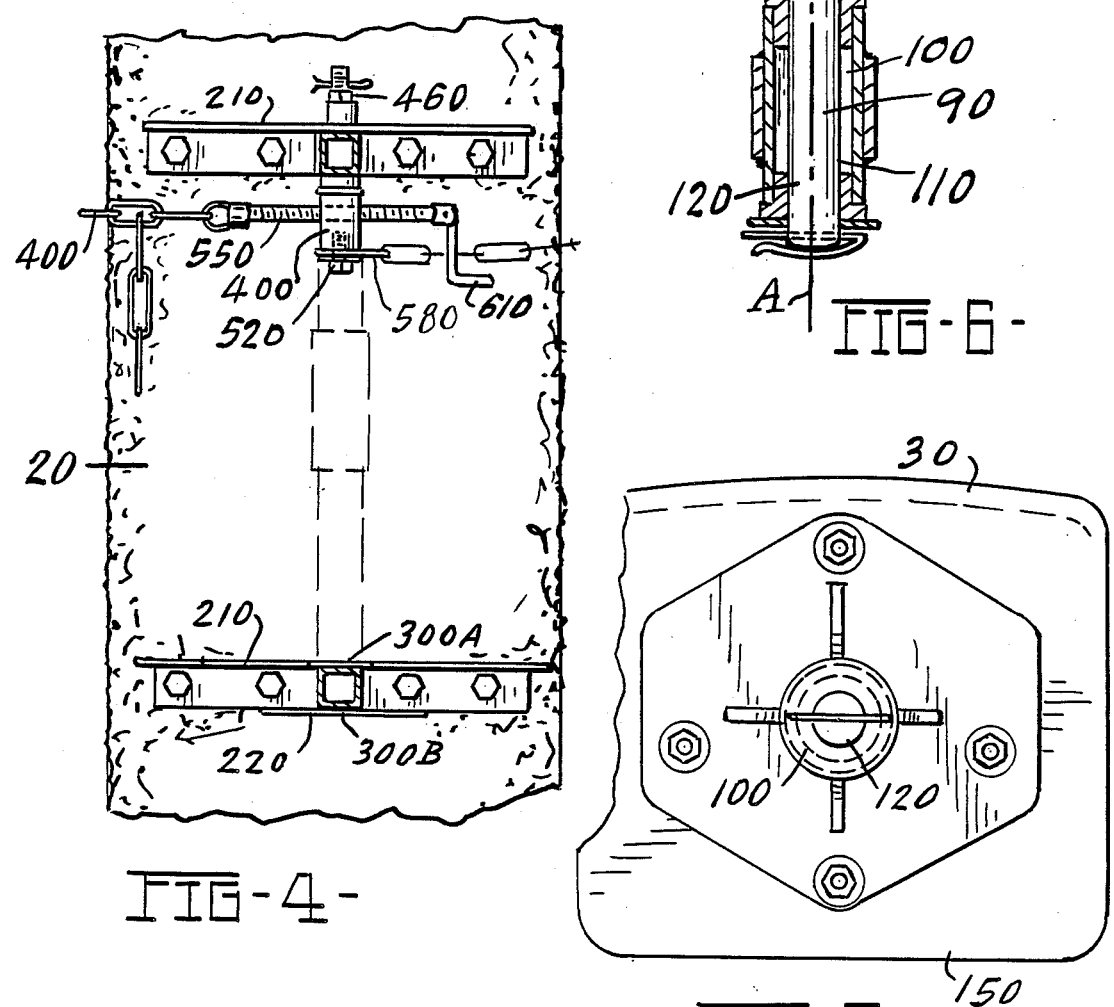

TREE STAND FOR OBSERVATION POST

DISCUSSION OF PRIOR ART AND BACKGROUND OF THE INVENTION

The subject invention is a portable tree stand utilized for observation purposes and in this regard relates to those types of devices that are used as portable and temporary devices to be affixed along the vertical height of a tree, or similar pole-like object so as to provide a temporary perch for one to sit, in such position, for work purposes, observation purposes or other related purposes.

In this latter respect, many such temporary tree perches are used for work purposes, such as the aloft device used by lumberjacks in sawing or cutting timber. On the other hand, there are relatively few such devices that are used for sport-related observation purposes, such as in hunting. In the sport of hunting, irrespective of whether firearms or archery means are used as a vehicle to accomplish the hunting purpose, such an elevated viewpoint can enhance the hunter's ability to detect game and shoot the animal in the process.

This invention is conceived as a device to help enhance or increase this observational ability and the following objects of the subject invention are directed accordingly.

OBJECTS

It is an object of the subject invention to provide an improved tree observational device;

It is also an object of the subject invention to provide an improved stand for vertical positioning at an elevated position;

Yet another object of the subject invention is to provide an improved observational device;

DESCRIPTION OF GENERAL EMBODIMENT

The subject invention is a portable tree stand for observation purposes, and generally comprises, as the basic support member, a triangularly-shaped member, basically formed as a right triangle, when observed from the perspective of a side elevational view. Disposed in the leg of the triangular member which is comparable to the hypotenuese side of such triangular member, is an opening which is adapted to hold a longitudinally and vertically extending shaft member, the upper portion of which is affixed in a pivotal manner to the undersurface of a seat structure. The upright leg of the support structure, which leg is comparable to the vertical leg of the triangle, has upper and lower support elements adapted to engage the outer circumference of a tree trunk so as to affix the apparatus in a vertical position along said tree trunk.

DESCRIPTION OF PREFERRED EMBODIMENT

In describing the preferred embodiment of the subject invention, the term "upper" will refer to the upper part of the tree, or object to which the subject device is attached. The word "lower" will be used in the opposite perspective. The word "outer" or "frontal" will be used in reference to those areas of a tree, etc., which are directed horizontally away from the center of the tree, while the word "inner" will be used in contradistinct.

Referring now to the drawings in which a preferred embodiment of the subject invention, and particularly to FIGS. 1 and 2, a tree stand observational apparatus 10 can be seen. Such apparatus 10 is structured so as to be temporarily positioned at any height along the vertical extent of a tree 20 or similar vertical member, to enable the user to sit in a seat 30 in wuch elevated position supported by such apparatus 10.

As can be determined from FIGS. 1 and 2, the base support member 50 is shown for the subject apparatus 10. As can be seen, the base support member is a triangular-shaped member, when viewed from a side elevational view as seen in FIG. 2. Moreover, as can be observed from the upper elevational view of FIG. 1, the triangular basic support or frame member 10 is essentially uniplanar. In specific reference to FIG. 2 the triangular shaped frame member 50 is comprised of three basic legs 60A, 60B, and 60C, and as can be seen, in the preferred embodiment of the subject invention, these three legs are positioned and affixed together in an approximate right triangular configuration, with bottom leg 60A being generally adapted for positioning in a horizontal position. Leg 60B is adapted to be vertically positioned in a perpendicular relationship to leg 60A, while leg 60C which is equivalent to the hypoteneuse of the right triangle, connects to the ends 60A and 60B in the angular position shown in the drawings. It is to be noted that the angular relationship, angle A of leg 60C to leg 60A in FIG. 2 is shown as being approximately thirty degrees, such angle is not critical to the implementation of the subject invention.

In the preferred embodiment of the subject invention, as shown in FIG. 2, vertical leg 60B is positioned in such a relationship that the adjoining ends 70A and 70B of legs 60C and 60A, respectively, extend beyond the leg 60B, as shown. By this latter relationship, the ends of legs 60A and 60C are projected a short distance to the left of leg 60B in the particular dispositon as seen in FIG. 2, which projection to the left, as seen in FIG. 2, will be an inwardly projecting direction, i.e., towards the tree trunk, as will be more fully described below.

Attention is again addressed to FIG. 2 of the drawings, and as can be seen, the upper leg 60C has a transverse bore 90 extending through the vertical extent of the leg 60C, such bore being located in the approximate middle of such leg. Concentrically seated in such bore 90 is a cylindrically-shaped sleeve member 100 having a hollow interior chamber 110, also of cylindrical disposition. As can be seen from the drawings, the internal cylindrical chamber of the sleeve is adapted to concentrically and securely receive, in a downwardly projecting direction a longitudinal support shaft 120, also of cylindrical disposition. As can be observed from the drawings, the upper part of the vertical support shaft 120 is adapted to be affixed in a supporting fashion to the undersurface 150 of seat member 30.

As can be seen in FIG. 2, the vertical support shaft 120 for the seat member 30 is inserted into the sleeve 100 in the leg 60C in a rotatable manner, as seen in detail in FIG. 6, thus enabling the seat 30 to swivel about a vertical axis A—A to some limited extent. Moreover, as shown in the drawings, the seat member 30 is faced towards the corner 170 or apex of the triangular frame 50 where legs 60A and 60C join at an acute angle, as seen in FIG. 2. For reference purposes, this will be referred to as the forward end of the frame member 50.

The rear portion 200 of the support frame 50 holds the upper and lower tree attachment elements 210 and 220 respectively. In particular, the upper attachment element 210 is affixed to the rear portion of leg 60C, as shown, while the lower tree attachment element 220 is affixed to the rear portion of leg 60A of the support frame.

As can be observed from a view of FIG. 2, the lower tree attachment element 220 is a U-shaped member 250 rotatably mounted to the left or rear end of leg 60A, with the joinder leg 280 of such U-shaped member facing to the rear and away from such leg 60C. As can be seen, the parallel legs 300A and 300B of such U-shaped member stradle the upper and lower faces of the end 70A of leg 60A, with a pivot pin not shown, through such leg 60A to permit such U-shaped member to pivot relative to the end 70A of leg 60A.

As can be seen from a view of FIG. 2, the upper attachment element 210 comprises two basic structural elements. Specifically comprising the upper attachment element 210 are two independent affixation members, one being a rotatably mounted turnbuckle member 400 adapted to be affixed to a chain member 410, which, in turn, is adapted to encircle and be locked securely about the tree 20. The other independent attachment element 420 of upper attachment 210 is U-shaped, as seen in a top elevational view of such attachment 210. More particularly, the upper left end 70C of leg 60C has a vertically, directed bore 460 directed through said end, which bore is adapted to be aligned parallel to the vertical central axis of the tree when the device 10 is placed in position, as shown in FIG. 2.

Adapted to be inserted through the bore 460 is a longitudinally extending bolt member 500 having an upper hexagonally-shaped head 510, with a lower end 520. A transverse circular bore 530 is machined through the shank of bolt member 500, as seen in FIGS. 2 and 3. More specifically, as shown in the drawings, such transverse bore 530 is aligned to be perpendicular to the longitudinal central axis of the bolt member 500. The bore 530 is threaded on its interior surface so as to matingly receive a threaded cylindrical turnbuckel shaft 550, as shown. On the extreme lower end 520 of bolt member 500 is a U-shaped attachment member 580, which is adapted to receive the distal end 680 of chain 410, as shown.

The turnbuckle shaft 400 has a handle member 610, which when turned clockwise serves to tighten a chain 410 integrally connected to the distal end 610 of the turnbuckle shaft 400 and which chain 410 is sufficiently long to be adapted to fit securely around the girth of the tree 20 as shown in FIG. 2.

As can be seen from the drawings, the device 10 can be pivoted to a limited degree about the imaginery axis A—A extending through the upper and lower attachment members respectively.

I claim:
1. A stand for observation purposes, capable of being attached at an elevated position on a longitudinally extending vertical member affixed in the group, said device comprising:
(a) a frame member; said frame member comprising a right triangular member, as viewed from a side elevational view, with the lower leg of such triangle being adapted to be parallel to the ground and the upper leg being the hypotenuse of such triangle;
(b) means in hypotenuse leg of such triangle said frame member to pivotally hold a support portion of a seat member;
(c) attachment means affixed to said frame member to affix said frame member to a portion of said longitudinally extending member, said attachment means comprising pivotable members affixed to the frame member, which pivotable members are in turn provided with means to affix said attachment means to the vertical member.

* * * * *